(12) United States Patent
Miller et al.

(10) Patent No.: US 10,443,792 B2
(45) Date of Patent: Oct. 15, 2019

(54) BATTERY-OPERATED LED LIGHTBULB AND METHOD FOR OPERATION THEREOF

(71) Applicant: Halo International Sezc Ltd., Georgetown, Grand Cayman (KY)

(72) Inventors: Garold C. Miller, Hartford, CT (US); Nathan Daniel Weinstein, Hartford, CT (US)

(73) Assignee: Halo International SEZC Ltd., Georgetown (KY)

( * ) Notice: Subject to any disclaimer, the term of this patent is extended or adjusted under 35 U.S.C. 154(b) by 0 days.

(21) Appl. No.: 15/840,583

(22) Filed: Dec. 13, 2017

(65) Prior Publication Data

US 2018/0163934 A1    Jun. 14, 2018

Related U.S. Application Data

(60) Provisional application No. 62/433,478, filed on Dec. 13, 2016.

(51) Int. Cl.

| | |
|---|---|
| *F21L 4/00* | (2006.01) |
| *F21K 9/233* | (2016.01) |
| *F21S 9/02* | (2006.01) |
| *F21K 9/238* | (2016.01) |
| *H05B 33/08* | (2006.01) |
| *F21L 4/02* | (2006.01) |
| *H05B 37/02* | (2006.01) |
| *F21V 23/04* | (2006.01) |

(Continued)

(52) U.S. Cl.
CPC ............ *F21L 4/005* (2013.01); *F21K 9/233* (2016.08); *F21K 9/238* (2016.08); *F21L 4/027* (2013.01); *F21S 9/022* (2013.01); *H05B 33/0809* (2013.01); *H05B 33/0845* (2013.01); *H05B 37/0218* (2013.01); *H05B 37/0227* (2013.01); *H05B 37/0281* (2013.01); *F21L 4/085* (2013.01); *F21V 23/04* (2013.01); *F21V 23/0407* (2013.01); *F21V 23/0421* (2013.01); *F21V 23/0464* (2013.01); *F21V 23/0471* (2013.01); *F21Y 2115/10* (2016.08); *Y02B 20/383* (2013.01); *Y02B 20/42* (2013.01); *Y02B 20/46* (2013.01)

(58) Field of Classification Search
CPC ....................................................... F21L 4/005
USPC ........................................ 362/20, 183, 184
See application file for complete search history.

(56) References Cited

U.S. PATENT DOCUMENTS

| | | | |
|---|---|---|---|
| 2004/0252491 A1* | 12/2004 | Parsons .................. | F21L 4/005 362/157 |
| 2010/0271802 A1* | 10/2010 | Recker ............... | H05B 33/0803 362/20 |
| 2015/0159825 A1* | 6/2015 | Flynn ...................... | F21S 9/02 362/183 |

* cited by examiner

*Primary Examiner* — Allyson N Trail
(74) *Attorney, Agent, or Firm* — McCormick, Paulding & Huber LLP

(57) ABSTRACT

A battery-operated light bulb can be used as (i) a regular light bulb, inserted into a standard light socket to be powered off an electrical grid; (ii) an automatically battery back-up emergency and safety light bulb for operation when the electrical grid is offline; and (iii) a portable flashlight when separated from the light socket. The light bulb is also equipped with a motion sensor for turning on the light bulb when movement is detected; a timer for turning off the light bulb after a preset time period, and an ambient light sensor for adjusting the intensity of the light bulb depending on ambient light levels, with all of which the operation of the light bulb can be controlled so as to conserve power, to preserve battery life so it is available when needed in emergency situations, and to prolong the life of the bulb.

14 Claims, 5 Drawing Sheets

(51) Int. Cl.
*F21L 4/08* (2006.01)
*F21Y 115/10* (2016.01)

BATTERY-OPERATED LED LIGHTBULB AND METHOD FOR OPERATION THEREOF

CROSS-REFERENCE TO RELATED APPLICATION

This application claims the benefit of U.S. Provisional Application No. 62/433,478, filed Dec. 13, 2016, the entirety of which is incorporated herein by reference.

FIELD OF INVENTION

The present invention generally relates to an LED light bulb, and more particularly relates to a battery-operated LED light bulb for installation and use in a house, especially during a power outage.

BACKGROUND OF THE INVENTION

Standard light bulbs are designed to be inserted into complementary light sockets and operate off an electrical grid of a house, building, school, hospital or emergency center. Generally, such a light bulb is merely installed into a socket, used when a light switch is turned on, then turned off with the switch, and not thought of until it goes dead and needs to be replaced. In an emergency situation, such as during a power outage, such standard light bulbs do not work; if there is no power to the electrical grid, then there is no power to the light bulb. People will resort to temporary, portable light sources, such as flashlights and candles, but such light sources may not sufficiently light a room. A building may have an emergency power source, such as a generator, which will provide the ability to keep a room lit, but in severe emergency situations with a power outage that might not be fixed for a while, the user typically must try to optimize use of the generator and selectively use the back-up power to operate necessary devices within the home. As a result, the user typically will not use up the generator power on lighting throughout the building, and opt, instead, to rely on flashlights and candles. More industrial buildings, schools, hospitals and emergency centers, will have dedicated emergency lighting operating off a generator, but residential buildings often do not have such emergency back-up systems in place.

Another issue with standard light bulbs is that they often have just one operational mode. That is, they simply operate at a constant wattage until they stop working. If the light bulb is hooked into an emergency power system, it will use up power so long as the light is on, even if there is sufficient ambient light to help the user without needing any lights on in a room or building. In general, much energy is wasted by keeping lights on—especially emergency lights—longer than necessary. Additionally, much energy is wasted by using light bulbs, even in normal non-emergency usage, at full intensity, whereby adjusting such intensity, even slightly based on alternative light sources, could preserve some power.

In view of the foregoing, there is a need for a light bulb that can be used as a normal light bulb—that is, inserted into a standard light socket to be powered off of an electrical grid—but also available for use during a power outage to provide safety lighting. Additionally, there is a need for such a light bulb that is portable and useable even when it is not inserted into a light socket, or even when removed from a light socket, such as in an emergency situation. That is, there is a need for a light bulb that utilizes battery power and can therefore be used as a portable flashlight as a functionality in addition to its normal use as a standard light bulb. Further, there is a need for a method of operation of such a light bulb so as to preserve the battery power, both in normal use and in emergency use. Accordingly, there is a need for a battery-operated light bulb having a built-in timer that can control the amount of time the light bulb is on, and/or a sensor system that can determine and adjust as necessary the intensity of light needed for an emergency situation, including if the light bulb even needs to be on if sufficient ambient light is available. Still further, there is a need for a light bulb that can turn on automatically given a power outage, a sensed low level of ambient light, or operate as safety lighting based on motion sensed in the room in which the light bulb is installed. Accordingly, it is a general object of the present invention to provide a portable charger that improves upon conventional light bulbs currently on the market and that overcomes the problems and drawbacks associated with such prior art light bulbs.

SUMMARY OF THE INVENTION

In accordance with the present invention, a battery-operated light bulb, and more preferably, an LED light bulb, is provided and can be used in multiple different operational modes. First, the light bulb in accordance with the present invention can be used as a standard light bulb adapted for insertion into a standard light socket and powered off the electrical grid associated with the light socket. Second, the light bulb in accordance with the present invention can be operated using a battery back-up, whereby a battery including in the bulb housing can operate the light bulb when the electrical grid is not available or the switch associated with the light socket in which the light bulb is installed is not turned on. In this regard, the light bulb can operate as emergency or safety light, especially useful in emergency situations, such as a power outage. Third, the light bulb in accordance with the present invention can be used as a flashlight, for example, it can be removed from the light socket in which it is normally installed, and carried around while being powered from the internal battery and operate as a portable flashlight.

In accordance with an embodiment of the present invention, the light bulb comprises a bulb housing having a threaded base adapted for insertion in a standard light socket. A rechargeable battery is disposed within the bulb housing and in operative communication with one or more LED lights. In preferred embodiments, the light bulb further includes a control module in operative communication with the battery and the LED lights that can coordinate operation of the light bulb in many ways in accordance with the present invention. First, the control module can monitor the power being supplied to the light bulb via the electrical grid and detect an emergency situation, such as when the power goes out. In such an emergency situation, the control module can automatic turn on the LED lights and power said lights from the internal battery of the light bulb. Further, the control module can include a timer which automatically turns the light bulb off after a preset time period when the bulb is in emergency mode. The time can also be used if the bulb is in a normal operational mode where it is powered off the electrical grid.

The control module can also be operatively connected with a light sensor, which measures the ambient light in a room, whereby the control module can determine an appropriate intensity of the light bulb given the sensed ambient conditions. In a preferred embodiment, the light bulb can turn off and preserve power if it is determined that there is sufficient light in a room so that the light bulb is not needed. This is especially advantageous when the bulb is operating in emergency mode off the internal battery. Further, at varying levels of ambient light, the intensity of the LED lights can be adjusted up or down by the control module as a means of preserving power.

The control module can also be operatively connected with a motion sensor whereby the light bulb can operate as a safety light. That is, in preferred embodiments, a 360-degree motion sensor is located on the rounded end of the light bulb housing (opposite from the threaded base end) and automatically turns on the light when movement is detected. In this regard, the light bulb can turn on when a person enters an otherwise dark room. The light bulb can be powered from either the electrical grid or the internal battery back-up for such safety usage. The control module can thereafter turn off the light after a preset time period so long as the sensors do not detect the continued presence of the person in the room. Such controlled operation of the light bulb, even when being powered off the electrical grid, can preserve energy.

In another aspect of the present invention, the internal battery can be charged while the light bulb is connected to an electrical grid, such as via the light socket in which the light bulb can be inserted as intended. That way, the back-up battery will have sufficient power in an emergency situation, such as a power outage. If the light bulb is used in portable flashlight mode, the internal battery can be recharged once the bulb is reconnected with the electrical grid (i.e., reinserted into a light socket). In alternate embodiments, the bulb housing includes a removable cap, which allows access to the interior of the bulb housing and permits removal and replacement of the internal battery, as necessary.

These and other objects, features and advantages of the present invention will become apparent in light of the detailed description of embodiments thereof, as illustrated in the accompanying drawings.

DETAILED DESCRIPTION OF THE DRAWINGS

Figure 1:
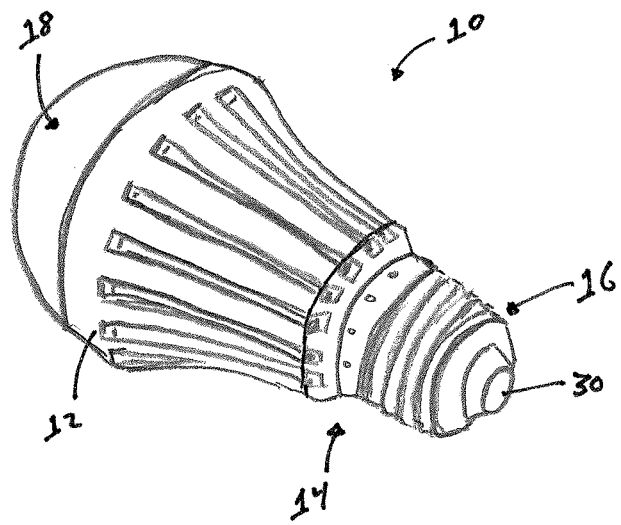
FIG. 1 shows a perspective view of an embodiment of a battery-operated light bulb in accordance with the present invention.
Figure 2:
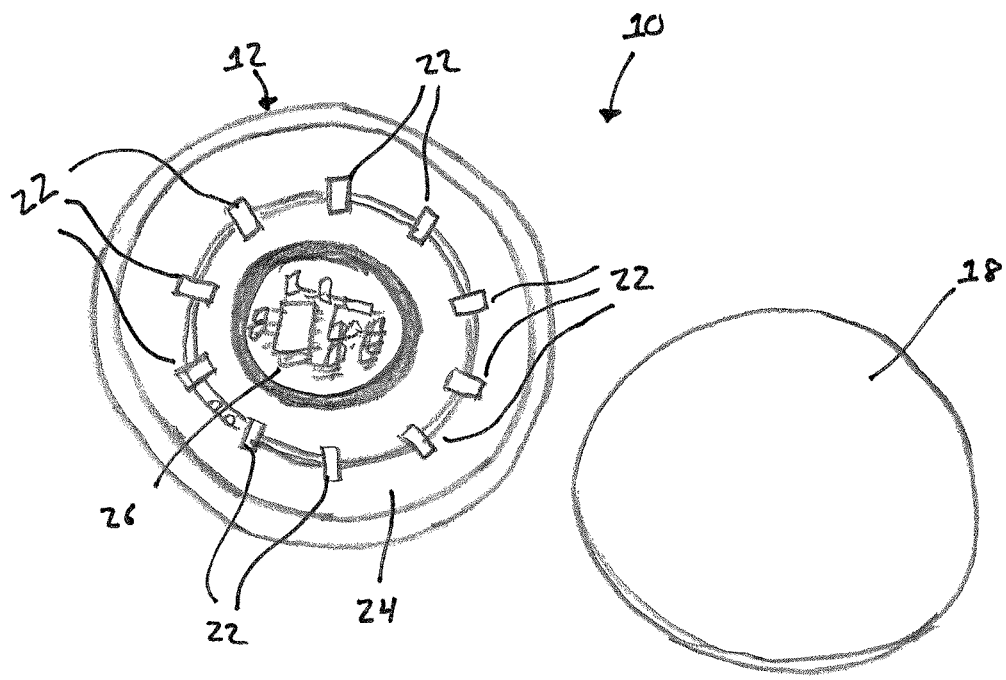
FIG. 2 shows a partially exploded view of the battery-operated light bulb of FIG. 1.

A battery-operated light bulb 10 in accordance with embodiments of the present invention is generally shown in FIGS. 1-2. As illustrated, the light bulb 10 comprises a light bulb housing 12 having a first support end 14 with a threaded base 16 adapted for insertion in a standard light socket. In this regard, the light bulb 10 can be installed and used like a standard light bulb by inserting it into the light socket where it can be powered by the electrical grid to which the light socket is connected. At the opposite end of the bulb housing 12, a removable cap 18 is provided, as illustrated in FIG. 2, so as to permit access to the interior of the light bulb 10 and the internal operational components contained therein.

Figure 3:
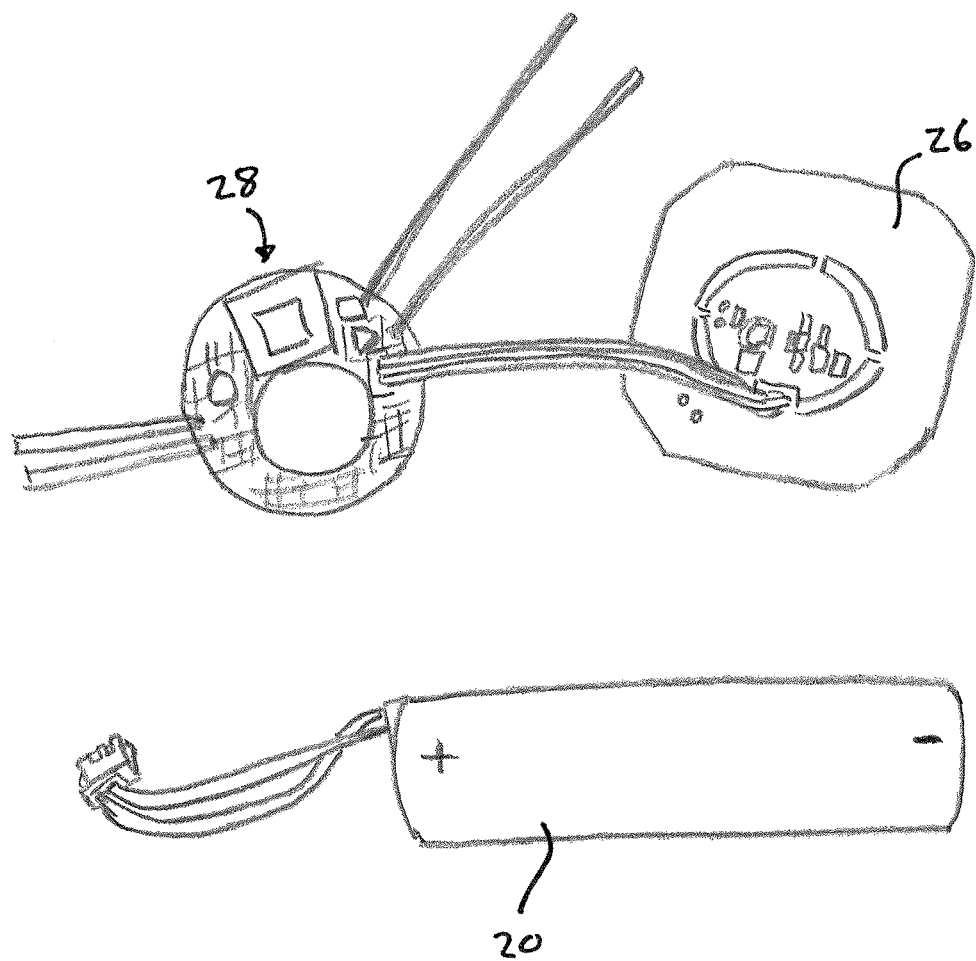
FIG. 3 shows a further exploded view of internal operational components of the battery-operated light bulb of FIG. 1.

In accordance with preferred embodiments of the present invention, a rechargeable battery 20 is disposed within the bulb housing 12 and is in operative communication with one or more LED lights 22. An array of LED lights 22 is illustrated in FIG. 2 as mounted in a circular arrangement on an LED support board 24 connected to a radar motion sensor board 26. Alternate arrangements of LED lights, as well as varying number of LED lights can be used without departing from the spirit and principles of the present invention. When the cap 18 is removed from the bulb housing 12, the LED support board 24 and the radar motion sensor board 26 can also be removed to gain access to the rechargeable battery 20. The backside of the radar motion sensor board 26, as removed from the bulb housing 12, is provided in FIG. 3 along with a control module 28 and the rechargeable battery 20.

Figure 4:
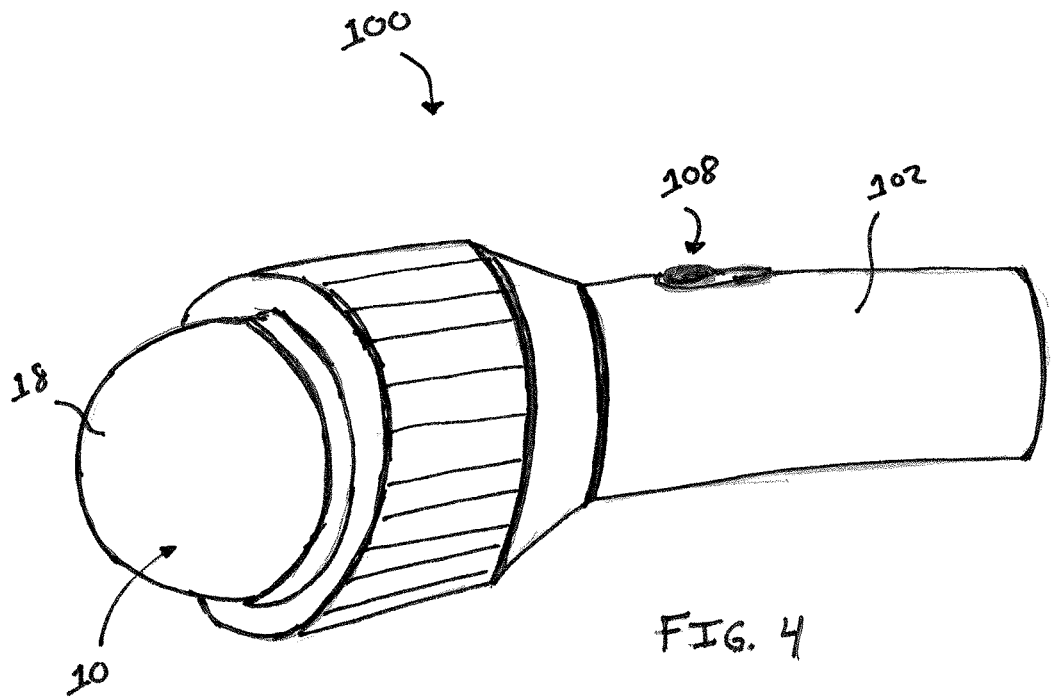
FIG. 4 shows a perspective view of the battery-operated light bulb of FIG. 1 being used in portable flashlight mode.
Figure 5:
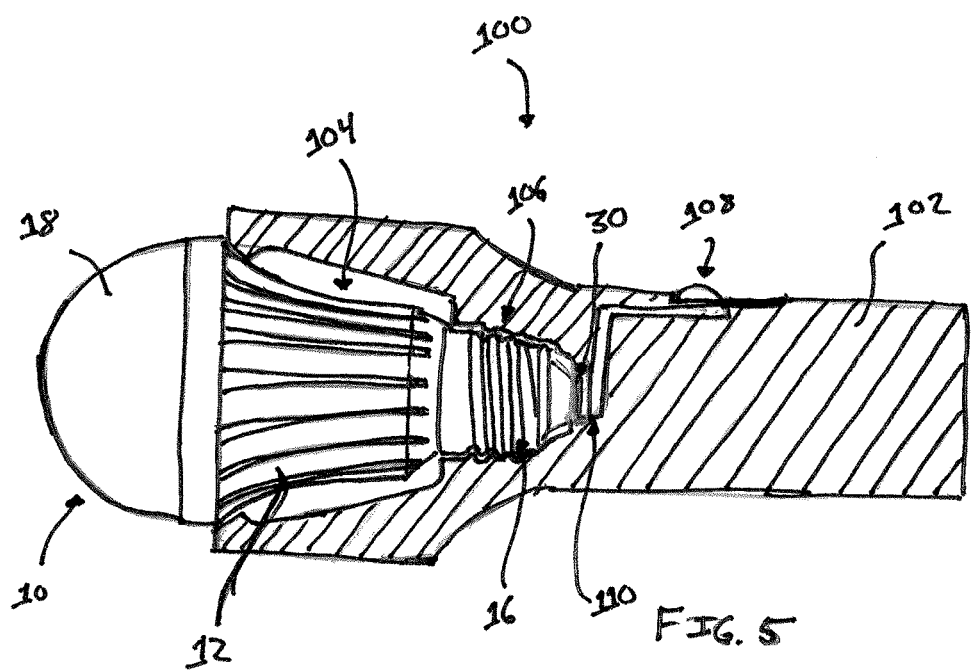
FIG. 5 shows a partial side cross-sectional view of the battery-operated light bulb of FIG. 4.

In accordance with preferred embodiments of the present invention, the light bulb 10 can be used in multiple different operational modes. First, the light bulb 10 can be used as a standard light bulb adapted for insertion into a standard light socket and powered off the electrical grid associated with the light socket. Second, the light bulb 10 in accordance with the present invention can be operated using battery back-up, whereby the rechargeable battery 20 including in the bulb housing 12 can operate the light bulb 10 when the electrical grid is not available or the switch associated with the light socket in which the light bulb 10 is installed is not turned on. In this regard, the light bulb 10 can operate as emergency or safety light, especially useful in emergency situations, such as during a power outage. Third, the light bulb 10 in accordance with the present invention can be used as a flashlight 100, for example, it can be removed from the light socket in which it is normally installed, and carried around while being powered from the internal battery 20 and operate as a portable flashlight 100, such as illustrated in FIGS. 4-5.

In preferred embodiments, the light bulb 10 further includes a control module 28 in operative communication with the battery 20 and the LED lights 22 that can coordinate operation of the light bulb 10 in many ways in accordance with the present invention. The control module is generally designated by reference numeral 28 in FIG. 3, and as illustrated, includes an LED driver, a sensor signal processing circuit, and intelligent control for the light bulb in all operational modes. The control module 28 further includes overcharge protection circuit and an over discharge protection circuit, as described in more detail below.

The battery 20 is preferably a rechargeable Lithium-Ion battery. The control module 28 includes an overcharge protection circuit that will prevent overcharging the battery 20 in use—that is, the circuit will not allow individual cells within the battery 20 to be charged once they reach or are equal to a predetermined voltage level, for example, 4.2V. The control module 28 further includes an over-discharge protection circuit to prevent too much discharge and avoid damaging the battery 20 during use—that is, each cell must no discharge beyond a predetermined voltage level, for example, 3.0V. Preferably, the internal battery 20 can be charged while the light bulb 10 is connected to an electrical grid, such as via the light socket in which the light bulb 10 can be inserted as intended. That way, the back-up battery 20 will have sufficient power in an emergency situation, such as a power outage. In alternate embodiments, the bulb housing 12 includes a removable cap 18, which allows access to the interior of the bulb housing 12 and permits removal and replacement of the internal battery 20, as necessary.

Figure 6:
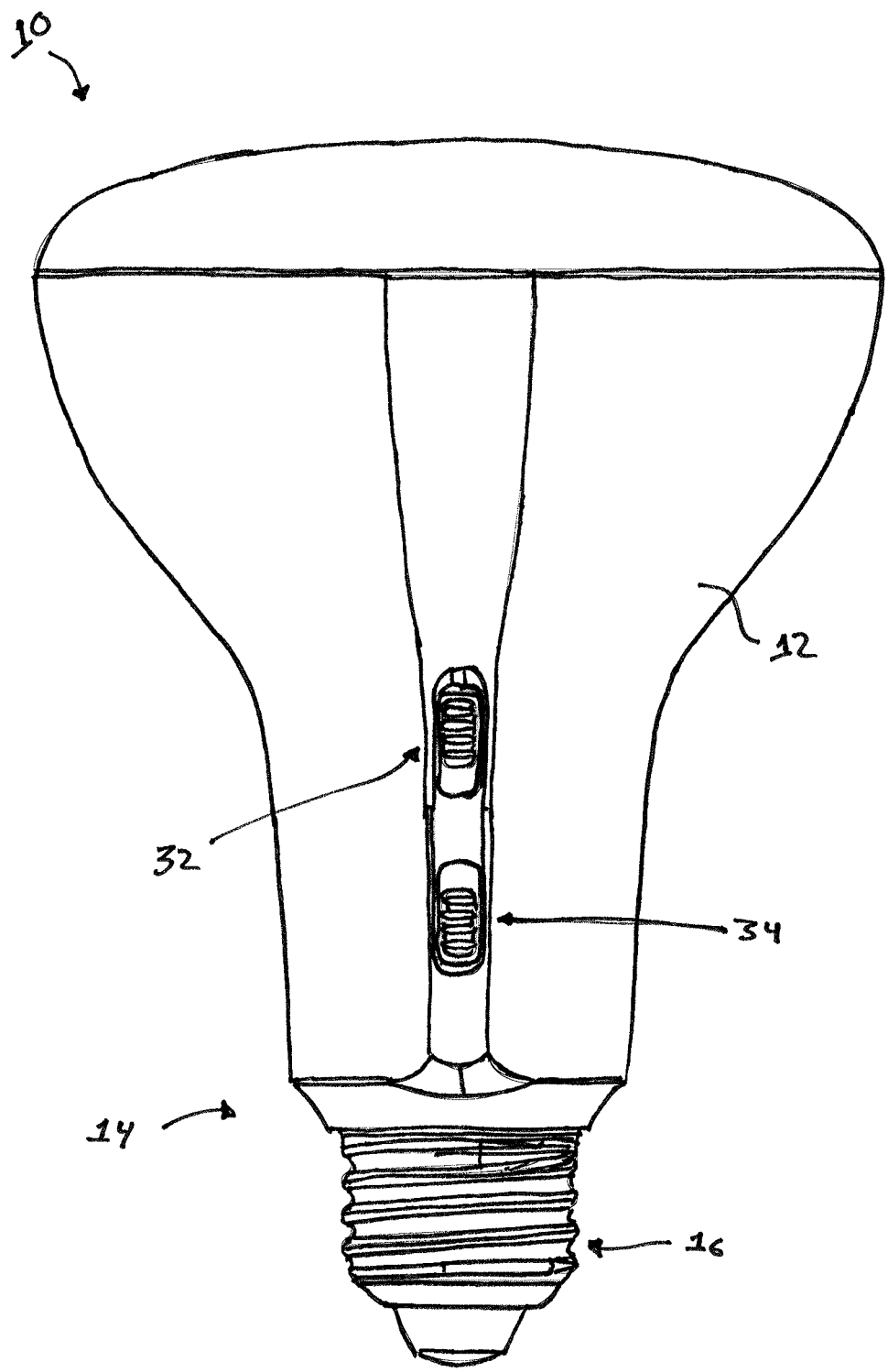
FIG. 6 shows a planar side view of an alternate embodiment of a battery-operated light bulb in accordance with the present invention.
Figure 7:
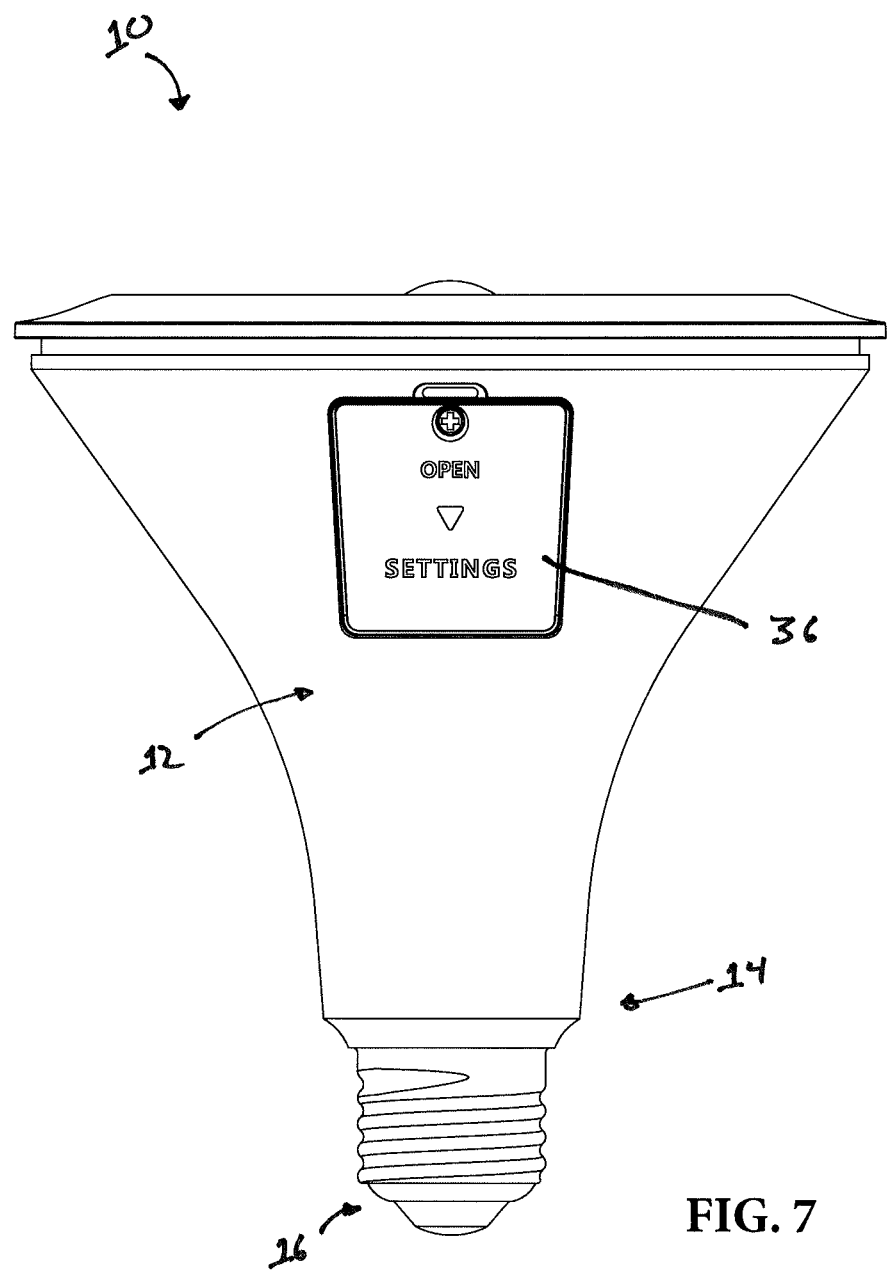
FIG. 7 shows a planar side view of another alternate embodiment of a battery-operated light bulb in accordance with the present invention.

In accordance with the present invention, the light bulb 10 includes a motion sensor that triggers the light bulb 10 to turn on when it sense movement in the room. This obviates the need to turn on the light with a wall switch, though the light bulb 10 can still be operated—both on and off—by use of such a standard switch. Referring to FIG. 2, the motion sensor is preferably mounted on the radar motion sensor board 26. With the motion sensor—which preferably can detect motion in 360 degrees so that it is able to cover movement anywhere in a room in which the light bulb 10 is installed—the light bulb 10 will turn on and then stay on for a predetermined or present time period. For example, the light bulb 10, once turned on by activation via the motion sensor, can stay on and then automatically turn off after an hour. In preferred embodiments, the preset time that the light bulb 10 stays on can be set by the user, for example, using a toggle switch provided time options—such as 15 minutes, 30 minutes, or 1 hour (such as illustrated in the embodiment of FIG. 6), or using a programmable settings control input provided on the housing 12 (such as illustrated in the embodiment of FIG. 7). Alternatively, the light bulb 10 can be programmed from a computer or cellphone via a wireless data communications exchange, such as via Bluetooth®, whereby wireless components are provided in the light bulb 10 as necessary for the exchange of data.

In operation, the light bulb 10 can be turned on using a light switch associated with the light socket in which it is installed. It can likewise be turned off using the light switch. The light bulb 10 can turn on using the motion sensor, such as when the sensor detects someone walking into a dark room. Alternatively, the light bulb 10 could be preprogrammed to automatically turn on at a particular time each day. Still further, the light bulb 10 could automatically turn on when the room reaches a certain level of darkness. When the light bulb 10 turns on automatically, it can be turned off at any time using the light switch. Additionally, the light bulb 10 can be pre-programmed to automatically turn off, for example, after a preset time period, even if initially turned on via the switch. This helps save energy by not leaving the light on too long and especially if a user forgets to turn of the light after leaving the room.

The light bulb 10 in accordance with the present invention is intended for emergency and safety use. Thus, it contains its own battery back-up so that when the electrical feed to the light bulb 10 through the socket is not available—for example, during a power outage—the battery back-up will kick in so that the light bulb 10 can continue to operate. In this regards, the light bulb 10 can operate in multiple manners. First, the control module 28 can monitor the power being supplied to the light bulb 10 via the electrical grid and detect an emergency situation, such as when the power goes out. In such an emergency situation, the control module 28 can automatically turn on the LED lights 22 (or keep them on if the light bulb 10 was already on when the power went out) and power said lights from the internal battery 20 of the light bulb 10. At the same time, the control module 28 will internally switch the light bulb 10 into an emergency operation mode which thereafter controls operation of the bulb 10 until power from the electrical grid is restored, at which time, the control module 28 can switch the bulb 10 back into normal operation mode. In emergency operation mode, the light bulb 10 can also turn on in emergency situations using the motion sensor. Further, the control module 28 can include a timer that automatically turns the light bulb 10 off after a preset time period when the bulb 10 is in emergency operation mode. For example, in preferred emergency operation, the light bulb 10 will turn off after 10 minutes so as to preserve the life of the internal battery 20. Thereafter, the light bulb 10 can be turned on again via the motion sensor as the bulb 10 is needed. As noted above, the timer can also be used if the light bulb 10 is in a normal operational mode where it is powered off the electrical grid.

In accordance with the present invention, the light bulb 10 also has an ambient light sensor, which is optimal in the emergency operation mode for preserving the internal battery 20. The ambient light sensor is generally positioned at the end of the bulb housing 12 by the cap 18, and more preferably mounted on or relative to the radar motion sensor board 26. In order to preserve battery life, the light bulb 10 will only turn on if it detects a certain level of darkness in the room. Thus, if the bulb 10 is used in a bright room and it is daytime such that no extra light is needed, the ambient light sensor will measure the amount of light in the room and the control module 28 will determine whether to turn the bulb 10 on or not. In accordance with preferred embodiments, the control module 28 will still detect the loss of power even if it determines that the light bulb 10 is not needed due to sufficient ambient light detection. Thus, the light bulb 10 in such situation will not automatically turn on when the power goes out. However, the control module 28 will still switch the light bulb 10 into emergency operation mode such that the light can turn on automatically when the motion sensor is triggered. The motion sensor will coordinate with the ambient light sensor such that triggering the motion sensor will only turn on the light when the ambient light feedback determines that the level of light in the room requires the assistance of the light bulb 10 for safety purposes. Additionally, once the control module 28 has switched the bulb 10 into emergency operation mode, the light bulb 10 can be programmed to automatically turn on once the ambient light in the room, as measured by the ambient light sensor, is at a level that requires light from the light bulb 10.

The ambient light sensor is also useful in normal operation of the light bulb 10 for preserving bulb and battery life—that is, the control module 28 can determine to not turn on the bulb 10 even when the motion sensors are activated when it is determined that there is ample light in the room already.

In alternate embodiments, the ambient light sensor can be used to adjust the wattage and intensity of the light bulb 10. For example, if the room is dark, the bulb 10 can turn on to maximum brightness. However, if there is some ambient light—for example, at twilight—the bulb 10 can turn on, but at a reduced intensity. Similarly, the intensity can be adjusted while the bulb 10 is on. For example, in the morning, the bulb can turn on at a higher intensity and dim as the ambient light increases. Again, the adjustments in light intensity are especially useful when the light bulb 10 is operating in emergency mode so as to preserve the battery 20.

The light bulb 10 of the present invention can also be used in flashlight mode. In flashlight mode, the user can carry the bulb around like a standard flashlight and the bulb 10 lights up using power from the internal battery 20. In an embodiment, the housing 12 can have designated pressure points, sensors, or manual buttons that can be touched to illuminate the bulb 10. Referring to FIGS. 4-5, the light bulb 10 can be installed in a separate flashlight housing 102 to facilitate transport of the bulb 10 in such a mode. The bulb 10 can be inserted into the flashlight housing 102 for use as a flashlight 100, while the flashlight housing 102 protects the bulb 10 and makes it easier to carry as a flashlight 100. As shown, the flashlight housing 102 includes a cavity 104 adapted to receive the support end 14 and threaded base 16 of the bulb 10. The cavity 104 includes a threaded socket 106 that complements the threads on the base 16 of the bulb 10 so that the bulb 10 can be secured within the flashlight housing 102 by screwing the bulb 10 into the flashlight housing 102. The flashlight housing 102 can include a manual switch 108 that engages with a contact 30 on the bulb 10 via contacts 110 for turning it on and off. In the embodiment illustrated in FIG. 5, the contact 30 is located at the tip of the base 16 of the bulb housing 12.

The flashlight housing 102 is not necessary for use of the bulb 10 in flashlight mode. For example, the embodiment illustrated in FIG. 6 can be carried around and used in flashlight mode. As illustrated, a power switch 32 is provided for turning the bulb on and off. An additional switch 34 is illustrated for adjusting the present timer for the bulb 10 in normal use and emergency use when the bulb 10 is installed in a light socket, as described above. The timer can also be used when the bulb 10 is in flashlight mode. For example, in an emergency situation, a user can turn on the light bulb 10 and place it on a table to provide light to a room. The timer can be set as desired so that the light will automatically turn off per programming so as to preserve the battery life in the bulb 10.

If the light bulb 10 is used in portable flashlight mode, the internal battery 20 can be recharged once the bulb 10 is reconnected with the electrical grid (i.e., reinserted into a light socket).

In an alternate embodiment, the flashlight housing 102 can be provided with an extra battery (not shown) for powering the bulb 10 so as to preserve the battery life in the bulb 10. Once the battery in the flashlight housing 102 dies, the bulb 10 can switch to be powered from its internal battery 20.

Referring to FIG. 6, an alternate design for a light bulb in accordance with the present invention is provided. Similar components to the embodiment illustrated in FIGS. 1-2 and described above utilize the same reference designations. As illustrated, the bulb housing 12 is generally designed for use in recessed lighting fixtures, though the bulb can also be used in normal light fixtures as well. The bulb housing 12 further includes manual switches 32 and 34. Switch 32 is generally used to turn the bulb on and off. This switch 32 is typically used for flashlight mode. Switch 34 can be used for additional functions of the bulb 10. As illustrated, the switch 34 can be moved to positions associated with the timer for the bulb 10. That is, the user can set the length of time the bulb will stay on before it automatically turns of in order to preserve bulb and battery life. This setting can be made prior to the bulb 10 being inserted into a light socket. The bulb 10 also can be removed from its socket to reset the timer setting and then placed back in the socket.

Referring to FIG. 7, another alternate design for a light bulb in accordance with the present invention is provided. Again, similar components to the embodiment illustrated in FIGS. 1-2 and described above utilize the same reference designations. As illustrated, the bulb housing 12 is generally designed for use in recessed lighting fixtures, though the bulb can also be used in normal light fixtures as well. The bulb housing 12 further includes an access opening and door 36 through which the user can access the control module 28 to program or reset operation of the bulb 10—e.g., timer setting, intensity settings, motion sensor on/off, etc.—and also check on status information for the bulb 10—e.g., battery capacity, fault detections, etc.—or remove and replace the battery 20.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A battery-operated light bulb comprising:
   a bulb housing having a battery internally disposed therein, wherein said bulb housing has a threaded base adapted for insertion into a light socket connected to an electrical grid;
   at least one LED light;
   a control module for operating the at least one LED light; and
   an ambient light sensor in operative communication with the control module for determining the light level in a space where the light bulb is located;
   wherein the at least one LED light, when activated, can be powered from either the battery or the electrical grid when the light bulb is inserted in the light socket; and
   wherein the control module adjusts the intensity of the at least one LED light, when activated, based on measurements from the ambient light sensor.

2. The battery-operated light bulb according to claim 1, further comprising a motion sensor in operative communication with the control module wherein the control module can automatically activate the light bulb when movement is detected by the motion sensor.

3. The battery-operated light bulb according to claim 1, wherein the control module turns off the at least one LED light when the ambient light sensor measures a level of light in the space where the light bulb is located that corresponds to a light level where light from the light bulb is not needed to illuminate said space.

4. The battery-operated light bulb according to claim 3, wherein the light level at which the at least one LED light is tuned off can be pre-programmed.

5. The battery-operated light bulb according to claim 1, wherein the control module further comprises a timer for automatically turning off the at least one LED light after a pre-determined time period.

6. The battery-operated light bulb according to claim 5, wherein the pre-determined time period can be programmed.

7. The battery-operated light bulb according to claim 5, wherein the pre-determined time period can vary depending on whether the at least one LED light is powered from the battery or from the electrical grid when the light bulb is inserted in the light socket.

8. The battery-operated light bulb according to claim 1, wherein the battery is rechargeable.

9. The battery-operated light bulb according to claim 1, further comprising a switch on the bulb housing for manually turning the at least one LED light on and off.

10. A portable battery-operated light bulb comprising:
    a bulb housing having a battery internally disposed therein, wherein said bulb housing has a threaded base adapted for insertion into a light socket connected to an electrical grid;
    at least one LED light;

a control module for operating the at least one LED light;

an ambient light sensor in operative communication with the control module for determining the light level in a space where the light bulb is located; and a flashlight housing into which the light bulb housing can be inserted for portable use separate from the light socket;

wherein the at least one LED light can be powered from either the battery or the electrical grid when the light bulb is inserted in the light socket; and wherein the control module adjusts the intensity of the at least one LED light, when activated, based on measurements from the ambient light sensor.

11. The portable battery-operated light bulb according to claim 10, wherein the flashlight housing comprises a cavity with a threaded socket complementing the threaded base of the bulb housing for securing the light bulb housing within the flashlight housing for transport and use.

12. The portable battery-operated light bulb according to claim 10, wherein the flashlight housing includes a second battery for powering the at least one LED light when the light bulb housing is secured within the flashlight housing.

13. The portable battery-operated light bulb according to claim 10, further comprising a switch on the flashlight housing in operative communication with a contact on the bulb housing for manually turning the at least one LED light on and off.

14. The battery-operated light bulb according to claim 10, further comprising a motion sensor in operative communication with the control module wherein the control module can automatically activate the light bulb when movement is detected by the motion sensor.

* * * * *